July 28, 1970 — A. SABATINO — 3,522,105

BATTERY TERMINAL AND COVER CONSTRUCTION

Filed Sept. 3, 1968 — 2 Sheets-Sheet 1

INVENTOR
ANTHONY SABATINO

BY
ATTORNEYS

INVENTOR
ANTHONY SABATINO

BY

ATTORNEYS

United States Patent Office 3,522,105
Patented July 28, 1970

3,522,105
BATTERY TERMINAL AND COVER
CONSTRUCTION
Anthony Sabatino, Minneapolis, Minn., assignor to Gould-National Batteries, Inc., St. Paul, Minn., a corporation of Delaware
Filed Sept. 3, 1968, Ser. No. 756,918
Int. Cl. H01m 1/02
U.S. Cl. 136—168                                     8 Claims

ABSTRACT OF THE DISCLOSURE

A torque resistant connection between a battery terminal post and a battery cover having an irregular shaped cavity region on the top side of the battery cover which is filled with a hard setting material to produce an integral bonded connection between a terminal post and the battery cover.

BACKGROUND OF THE INVENTION

Field of the invention

This invention relates generally to storage battery terminal post connections and, more particularly, to a high torque resistant connection between a battery cover and a terminal post.

Description of the prior art

In order to provide a torque resistant and leak proof connection between a metal battery terminal post extending through a hard rubber battery cover, prior art hard rubber battery covers contained a metal bushing around the cover opening that was extended or built up by pouring molten lead into a form placed over the cover opening. The molten lead joined the battery terminal post and the bushing into an integral unit. This method produced a torque resistant and liquid tight connection between the hard rubber battery cover and the terminal post. This method works well with hard rubber batteries where the molten lead does not mar the hard rubber but it does not work well with plastic batteries because the molten lead mars the plastic creating an unsightly appearance.

In order to provide a liquid tight seal between a metal battery terminal post and a plastic battery cover without marring the cover, prior art plastic battery covers contained an elastic bushing around the battery terminal post and below the opening in the cover of the battery. To provide a torque resistant connection the underside of the plastic battery cover was formed with a notch for receiving a tab that extended radially outward from the battery terminal post. This produced a tongue and groove fit between the underside of the battery cover and the radial extension of the terminal post. This method produces a torque resistance connection between the plastic battery cover and the metal terminal which is sufficiently strong to withstand the normal abuse while still providing a liquid tight seal. Typically, these battery covers are made from thermo-plastic materials such as polypropylene. Although this is by way of illustration and it is evident that other battery cover materials could also be used.

Both these prior are connections between metal battery terminal post and hard rubber battery covers and metal battery terminal post and plastic battery covers have been sufficiently strong to endure the rough handling that occurs to the battery terminal posts used on cars, trucks, and the like. Recently, these batteries have been used more and more in applications such as battery powered golf carts and the like where a stud is formed into the metal battery terminal post. Frequently, these battery terminal posts are over-torqued by inexperienced persons having improper tools. The frequency at which battery terminal posts have torn loose from plastic battery covers and from the battery cells had made them unsuitable to people who own or manufactuer these types of battery powered vehicles, because if the connection between the terminal posts and the battery cell is ruptured, the battery must be discarded. Consequently, the stronger connections between the hard rubber battery covers have been used, however, oftentimes even the connections between metal terminal posts and hard rubber covers are ruptured by inexperienced personnel removing and placing the battery cable on the battery terminal posts. Also, in the process of manufacturing batteries for a golf cart or the like manufacturers have experienced difficulty because the terminal post often ruptures from the cover during the assembly process. Thus, in order to use these plastic batteries, it is necessary to have a more highly torque resistant connection between the battery cover and the terminal posts while still maintaining a liquid tight seal between the terminal posts and the battery cover. I have invented such a high torque resistant connection that in actual tests has withstood 300 inch-pounds of torque on the battery terminal post compared to prior art connections between the plastic battery cover and the metal terminal posts which have been able to withstand less than 100 inch-pounds of torque.

SUMMARY OF THE INVENTION

Briefly, the invention comprises a battery cover having a substantially circular opening for insertion of a substantially cylindrical metal battery terminal post and located on the underside of the cover is an annular extension having a cylindrical face. The cylindrical face is adaptable for receiving an elastic bushing so as to form a fluid sealing relation between the cylindrical face and the outer portion of the elastic bushing. The inner portion of the elastic bushing is adaptable for receiving a metal battery terminal post and providing a fluid sealing relation therebetween. An irregular shaped opening is provided in the top of the battery cover so that extending a battery terminal post through the circular opening in the elastic bushing, the battery cover, and the battery terminal post provides an irregular shaped annular cavity region around the terminal post which can be filled with a hard setting material so as to create a high torque resistant connection between the battery cover and the battery terminal post.

BRIEF DESCRIPTION OF THE DRAWING

Referring to the drawings, FIGS. 1 and 2 show a portion of a battery cover 10 having a circular opening 11 located therein for receiving a metal battery terminal post 17. Located on the top side of cover 10 is an annular flange 13 that extends vertically upward and completely around circular opening 11. Located interior to circular flange 13 is a radially inward extending circular lip 14 which is slightly recessed from the top of annular flange 13 so as to form an annular cavity 16 between annular flange 13 and battery terminal post 17 extending through circular opening 11. Located on the underside of battery cover 10 is an annular extension or skirt 20 that has a circular smooth surface 21 for receiving an elastic bushing 22. Elastic bushing 22 abuts against the inside surface 21 of annular extension 20 so as to create a fluid tight seal between the exterior surface 23 of elastic bushing 22 and interior surface 21 of extension 20 when a terminal post is forcibly extended through the opening in cover 10. Elastic bushing 22 has a slightly undersized inside diameter so that when battery post 17 is extended through opening 11 and center bushing 22 it creates a liquid tight seal between battery terminal post 17 and interior surface 22 of the elastic bushing 22.

Figure 1:
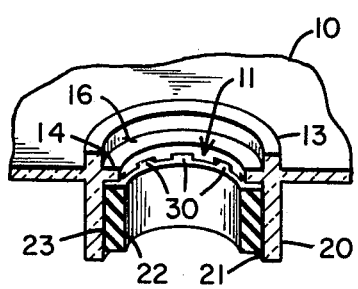
FIG. 1 is an oblique view, partially in section, showing one form of the irregular shaped opening in the battery cover.

Located on the underside of lip 14 and extending radially outward are a series of notches 30. These notches form a series of regions bounded on the top by lip 14 and on the bottom by the top of the elastic bushing 22. Battery post 17, which is slightly tapered, extends through elastic bushing 22 making a liquid tight seal between the battery cover 10 and battery terminal post 17.

Figure 2:
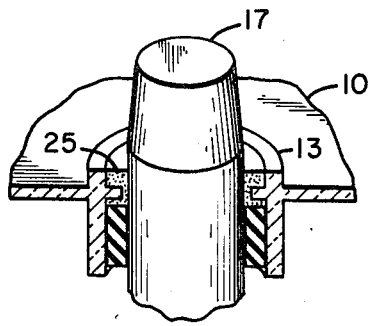
FIG. 2 is an oblique view, partially in section, showing a battery terminal post the irregular shaped opening of FIG. 1 containing a hard setting material.

Battery terminal post 17 is slightly smaller in diameter than the inner diameter of lip 14 so as to create an annular gap 25 between the radially inward extending end of lip 14 and the outer periphery of battery post 17. However, this annular gap 25 extends down only as far as to the top of the elastic bushing 22 where the top of elastic bushing 22 forms a sealing relation around the lower portion of the annular cavity 16 thus forming an annular cavity region. FIG. 2 shows the terminal post 17 as it has been affixed to cover 10 by filling annular cavity 16 and annular grap 25, and the notches between lip 14 and elastic bushing 22 with a hard setting material. Typical hard setting materials that could be used are synthetic resin such as epoxy and polyurethane, although this is by way of example only and no limitation intended thereto however epoxy resin is preferred and the description will include epoxy resin as the hard setting material. Ideally, the hard setting material hardens thus providing a bond and mechanical lock between the hard setting material and the cover as well as a bond between the hard setting material and the battery terminal post. However, it is difficult to achieve a bond between the plastic battery cover and the hard setting material without first treating the plastic battery cover. In typical applications, the hard setting material produces only a mechanical lock between the battery cover and the hard setting material. However, this is sufficient to produce a high torque resistant connection between the plastic cover and the hard setting material.

Figure 3:
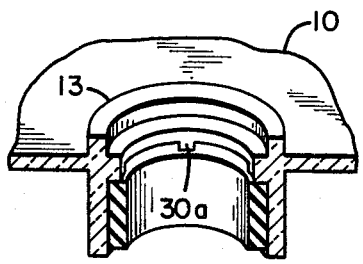
FIG. 3 is an oblique view, partially in section, of another irregular shaped opening in a battery cover.
Figure 4:
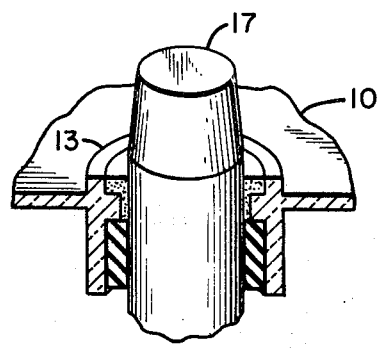
FIG. 4 is an oblique view, partially in section, showing the irregular shaped opening of FIG. 3 containing a hard setting material and a battery terminal post.

Because similar portions of the cover, with the exception of the irregular shaped regions, are identical, they will not be described in detail, however, the variations of the different embodiments of my invention will now be explained. FIGS. 3 and 4 show a variation of the notches 30 on lip 14. Instead of having narrow notches 30, there are radially extending protrusions 30a that extend downward from lip 14 to the top of the elastic bushing 22. Thus, there is created a much greater area for the epoxy resin to flow than in the embodiment shown in FIGS. 1 and 2. FIG. 4 shows how the battery terminal posts appear when epoxied to the top of battery cover 10.

Figure 5:
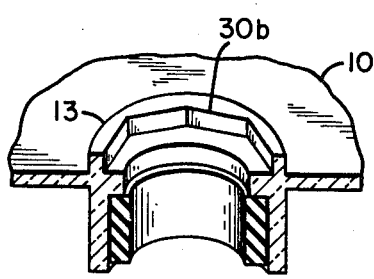
FIG. 5 is an oblique view, partially in section, of another irregular shaped opening in a battery cover.

FIG. 5 shows a battery cover 10 having annular flange 13 with an internal region having a polygonal shaped opening 30b instead of a circular opening. When this polygonal shaped region between cover 10 and battery post 17 is filled with an epoxy resin, it produces a mechanical lock between cover 10 and the epoxy resin.

Figure 6:
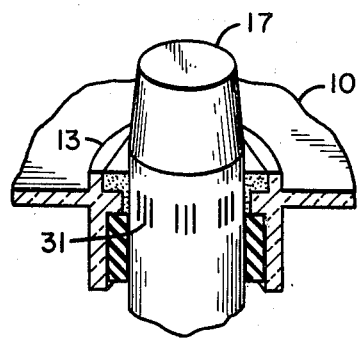
FIG. 6 is an oblique view, partially in section, showing the irregular shaped opening of FIG. 5 containing a hard setting material and a battery terminal post.

FIG. 6 shows the cover 10 having battery terminal post 17 extending therethrough and epoxied to cover 10. In addition to the mechanical lock formed between the epoxy resin and cover 10, there is also provided a mechanical lock between battery terminal post 17 and the epoxy resin. The mechanical lock between battery terminal post 17 comprises a series of vertical grooves 31 spaced around the peripheral region of the battery terminal post 17 so as to mechanically engage the hardened epoxy resin in the vertical grooves.

Figure 7:
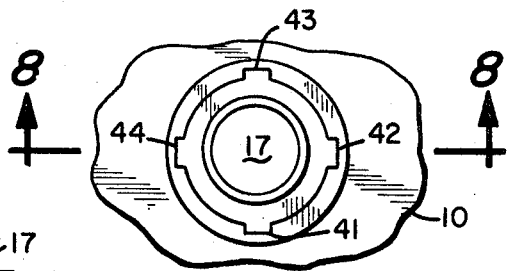
FIG. 7 is a top view of a battery cover having an irregular shaped region having the appearance of a plus sign.
Figure 8:
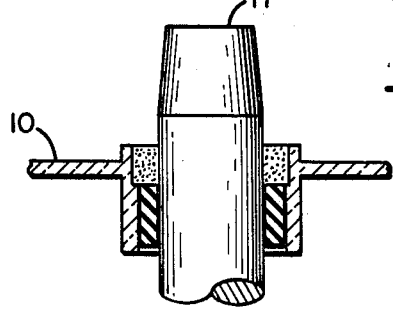
FIG. 8 is a cross section view taken along 8—8 of FIG. 7 showing a hard setting material located around the battery terminal post.

FIGS. 7 and 8 show still another embodiment of my invention wherein annular flange 13 has an annular cavity 16 having a first notch 41, a second notch 42, a third notch 43, and a fourth notch 44. These notches are spaced so that they are mutually perpendicular to one another so as to create the appearance of a plus sign. This has the advantage of producing a mechanical lock between the resin and the cover and also providing a quick visual indication to someone that this is a positive battery terminal post.

Figure 9:
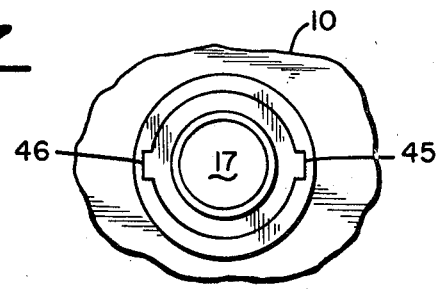
FIG. 9 is a top view of a battery cover having an irregular shaped region having the appearance of a minus sign.

FIG. 9 shows a similar annular flange 13 having an annular cavity 16 having a first notch 45 and a second notch 46 in alignment. The purpose of having only two notches is so as to create the appearance of a negative sign which would indicate that this is the negative battery terminal post.

In addition, the battery terminal posts can be color coded to indicate a positive or negative battery terminal posts by filling the annular cavities between the battery terminal post and the annular flange with a colored epoxy resin. For example, around the positive terminal the epoxy could be red and around the negative terminal the epoxy could be black.

Figure 10:
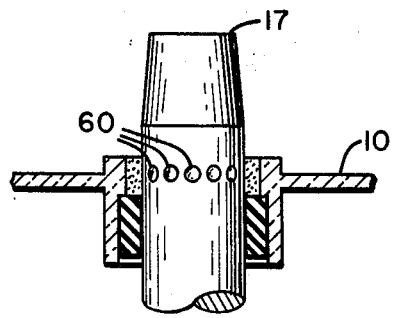
FIG. 10 is a cross sectional view of a battery terminal post having an irregular surface for receiving a hard setting material.
Figure 11:
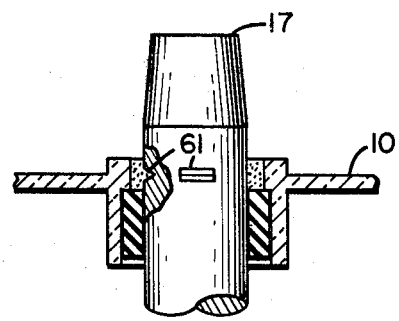
FIG. 11 is another cross section view of another irregular shaped battery terminal post for receiving a hard setting material.

FIGS. 10 and 11 show variations of the indentations in the terminal posts that have produced a good mechanical linkage between the terminal posts and the epoxy resin. Terminal post 17 of FIG. 10 has a series of spherical indentations 16 for mechanically engaging the resin and FIG. 11 has an elongated triangular shaped groove 61 for mechanically engaging the epoxy resin between the cover and the terminal post.

Figure 12:
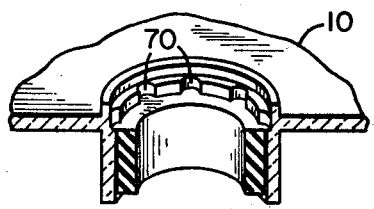
FIG. 12 is an oblique view, partially in section, of a preferred embodiment of an irregular shaped opening in a battery cover.
Figure 13:
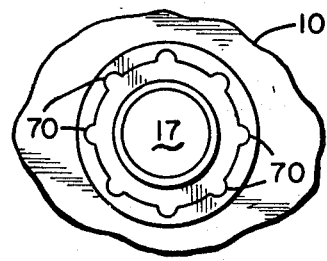
FIG. 13 is a top view of the irregular shaped opening shown in FIG. 12 containing a battery terminal post and a hard setting material.

FIGS. 12 and 13 show the preferred embodiment of the connection between the cover and terminal post 17. Located on the inner surface of lip 14 are a series of vertical cylindrical indentations 70 for mechanically engaging the resin to battery cover 10. This particular design shown in FIG. 12 has proved the most successful. Tests revealed that a battery terminal post epoxied to a cover having cylindrical indentations 70 on lip 14 has been able to withstand over 300 inch-pounds of torque applied to the battery terminal post. This is considerably better than prior art connections between battery terminals and the covers.

I claim:

1. An improved torque resistant connection between a battery terminal post and a battery cover comprising:
    (a) a battery cover having a substantially circular opening with a substantially cylindrical metal battery terminal post extending therethrough;

(b) a circular extension located on the underside of said cover, said circular extension having a cylindrical face;

(c) a bushing having an inner, an outer, and a top sealing surface positioned in said circular extension in fluid sealing relation with said cylindrical face and with said terminal post;

(d) said battery covers having a portion with an irregular shaped region, said portion of said cover abutting against said top sealing surface of said elastic bushing in a fluid sealing relation thereby forming an annular cavity region; and a hard setting synthetic resin material located in said annular cavity regions so as to form a mechanical connection between said irregular shaped surface of said cover and said hard setting material and a bond between said battery terminal post and said hard setting material.

2. The connection of claim 1 wherein said irregular shaped region comprises vertically extending cylindrical notches along the inside of said circular opening for engaging said hard setting material.

3. The connection of claim 1 wherein said irregular shaped region comprises a polygonal surface located along the inside of said circular opening for engaging said hard setting material.

4. The connection of claim 1 wherein said irregular shaped region comprises rectangular extensions located along the inside of said circular opening for engaging said hard setting material.

5. The connection of claim 1 wherein said irregular shaped region comprises four mutually perpendicular notches so as to create the appearance of a plus sign.

6. The connection of claim 1 wherein said irregular shaped region comprises two notches located in alignment so as to create the appearance of a minus sign.

7. The connection of claim 1 wherein said terminal post has a series of irregular indentations located thereon for mechanically locking the said hard setting material.

8. The connection of claim 7 wherein said hard setting material comprises an epoxy resin material.

References Cited

UNITED STATES PATENTS

| | | | |
|---|---|---|---|
| 2,558,246 | 6/1951 | Gray | 136—168.2 |
| 3,113,892 | 12/1963 | Albrecht | 136—168 |
| 3,285,785 | 11/1966 | Shannon | 136—168 |

FOREIGN PATENTS 1,344,668  12/1963  France.

WINSTON A. DOUGLAS, Primary Examiner

D. L. WALTON, Assistant Examiner

U.S. Cl. X.R.

136—170